US008286115B2

(12) United States Patent
Wetter et al.

(10) Patent No.: US 8,286,115 B2
(45) Date of Patent: Oct. 9, 2012

(54) FAST ROUTING OF CUSTOM MACROS

(75) Inventors: Holger Wetter, Weil im Schoenbuch (DE); Maarten Boersma, Holzgerlingen (DE); Wilhelm Haller, Remshalden (DE); Armin Windschiegl, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/330,664

(22) Filed: Dec. 9, 2008

(65) Prior Publication Data

US 2010/0146471 A1    Jun. 10, 2010

(51) Int. Cl.
    *G06F 17/50* (2006.01)
(52) U.S. Cl. ........ 716/119; 716/103; 716/118; 716/126; 716/139
(58) Field of Classification Search .......... 716/103, 716/118–119, 126, 139
    See application file for complete search history.

(56) References Cited

U.S. PATENT DOCUMENTS

| | | | | | |
|---|---|---|---|---|---|
| 5,471,398 | A | * | 11/1995 | Stephens | 716/104 |
| 5,808,896 | A | * | 9/1998 | Weber | 716/103 |
| 5,815,402 | A | * | 9/1998 | Taylor et al. | 716/103 |
| 5,875,115 | A | * | 2/1999 | Weber | 716/103 |
| 5,901,064 | A | * | 5/1999 | Weber et al. | 716/103 |
| 6,223,329 | B1 | * | 4/2001 | Ling et al. | 716/129 |
| 6,360,350 | B1 | * | 3/2002 | Gabele et al. | 716/113 |
| 6,574,779 | B2 | * | 6/2003 | Allen et al. | 716/103 |
| 6,721,923 | B2 | * | 4/2004 | Fisher | 716/103 |
| 7,293,247 | B1 | * | 11/2007 | Newton et al. | 716/111 |
| 7,418,693 | B1 | * | 8/2008 | Gennari et al. | 716/55 |
| 2002/0049958 | A1 | * | 4/2002 | Shimazawa | 716/18 |
| 2004/0230922 | A1 | * | 11/2004 | Allen et al. | 716/2 |
| 2006/0200789 | A1 | * | 9/2006 | Rittman | 716/19 |
| 2007/0268731 | A1 | * | 11/2007 | Weiland et al. | 365/51 |
| 2008/0046849 | A1 | * | 2/2008 | Choi | 716/6 |
| 2008/0282211 | A1 | * | 11/2008 | Culp et al. | 716/8 |

FOREIGN PATENT DOCUMENTS

JP    2007080256 A    3/2007

OTHER PUBLICATIONS

Dac Pham et al., Key Features of the Design Methodology Enabling a Multi-Core SoC Implementation of a First-Generation Cell Processor, IEEE, 8D-4, pp. 871-878, Publication Date: 2006.
Antonio J. Lopez Martin, Cadence Design Environment, Tutorial, Oct. 2002, pp. 2-51, Klipsch School of Electrical and Computer Engineering, New Mexico State University.

* cited by examiner

*Primary Examiner* — Naum Levin
(74) *Attorney, Agent, or Firm* — Cantor Colburn LLP; Matthew Talpis (57) ABSTRACT

A system for creating layout and wiring diagrams for an integrated circuit (IC) includes a placement engine configured to receive a hierarchical schematic and to create a placed layout. The system also includes a flat layout engine configured to receive the hierarchical schematic and to create a flat layout and a back annotation engine coupled to the placement engine and the flat layout engine, the back annotation engine configured to receive the hierarchical placed layout and the flat unplaced layout and to create a flat placed layout there from.

13 Claims, 6 Drawing Sheets

FAST ROUTING OF CUSTOM MACROS

BACKGROUND

The present invention relates to integrated circuits, and more specifically, to routing the connections between components of an integrated circuit (IC).

Integrated circuit layout, also known as IC layout, IC mask layout, or mask design, is the representation of an integrated circuit in terms of planar geometric shapes which correspond to the patterns of metal, oxide, or semiconductor layers that make up the components of the integrated circuit. When using a standard process—where the interaction of the many chemical, thermal, and photographic variables are known and carefully controlled—the behavior of the final integrated circuit depends largely on the positions and interconnections of the geometric shapes. A layout engineer's job is to place and connect all the components that make up a chip so that they meet all criteria. Typical goals are performance, size, and manufacturability.

Initially, IC design layout was done by hand using opaque tapes and films, much like the early days of PCB design. Modern IC layout is done with the aid of IC layout editor software, or even using EDA (Electronic Design Automation) tools, including place and route tools or schematic driven layout tools. The manual operation of choosing and positioning the geometric shapes is informally known as "polygon pushing".

Layout design takes a significant amount of time in the overall project schedule. Improving the turnaround time for layout design is key to enhance productivity. One of the major time constraints in the layout process involves the routing of wires between components. Layout turnaround time can be improved by using automated routing provided, for example, by a computer programming.

In custom macro design, the designer typically has a hierarchical schematic with a corresponding hierarchical layout. A hierarchical schematic is based off of base building blocks which are combined to form more complex components. However, due to the hierarchy of the structures, routing techniques currently used are not very efficient.

One approach to reducing the time for routing has been to employ the so-called "random logic macro" (RLM) approach. In the RLM approach, a hierarchical schematic is flattened to create a "flat" circuit. The flat circuit is then routed quickly and easily. This solution, however, suffers from the fact that after the circuit has been "flattened" it becomes hard to read. This is due, in part, to the fact that there are no blocks on the schematic that represent circuit elements that may be easily understood by a human.

Another approach is the custom macro approach. In this approach, the routing is conducted through each level of the hierarchy separately. This process is, however, time consuming and may encounter problems of efficiency in dealing with wiring blockages or other problems that can arise.

SUMMARY

According to one embodiment of the present invention, a system for creating layout and wiring diagrams for an integrated circuit (IC) is disclosed. The system of this embodiment includes a placement engine configured to receive a hierarchical schematic and to create a placed layout and a flat layout engine configured to receive the hierarchical schematic and to create a flat layout. The system of this embodiment also includes a back annotation engine coupled to the placement engine and the flat layout engine, the back annotation engine configured to receive the hierarchical placed layout and the flat unplaced layout and to create a flat placed layout there from.

Another embodiment of the present invention is directed to a computer based method of creating a flat placed layout for use in routing an integrated circuit (IC). The method of this embodiment includes creating a hierarchical schematic of the integrated circuit, the hierarchical schematic including high level descriptions of circuit components wherein each circuit component includes one or more cells of interest; creating a hierarchical, placed, non-routed layout from the hierarchical schematic; creating a flat layout from the hierarchical schematic, the flat layout including connectivity information between the one more cells of interest; for each cell of interest, traversing the hierarchical placed layout and accumulating relative placement information and back annotating the relative placement information to the connectivity information; and creating a routing diagram from a result of the back annotation.

Another embodiment of the present invention is directed to a computer program product for creating a flat placed circuit diagram. The computer program product includes a storage medium readable by a processing circuit and storing instructions for execution by the processing circuit for facilitating a method including: creating a hierarchical schematic of the integrated circuit, the hierarchical schematic including high level descriptions of circuit components wherein each circuit component includes one or more cells of interest; creating a placed, non-routed layout from the hierarchical schematic; creating a flat layout from the hierarchical schematic, the flat layout including connectivity information between the one more cells of interest; for each cell of interest, traversing the placed layout and accumulating relative placement information and back annotating the relative placement information to the connectivity information; and creating a routing diagram from a result of the back annotation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 2a and 2b show an example of a hierarchical schematic diagram (FIG. 2a) and a flat, unplaced layout (FIG. 2b) created there from;

DETAILED DESCRIPTION

Figure 1:
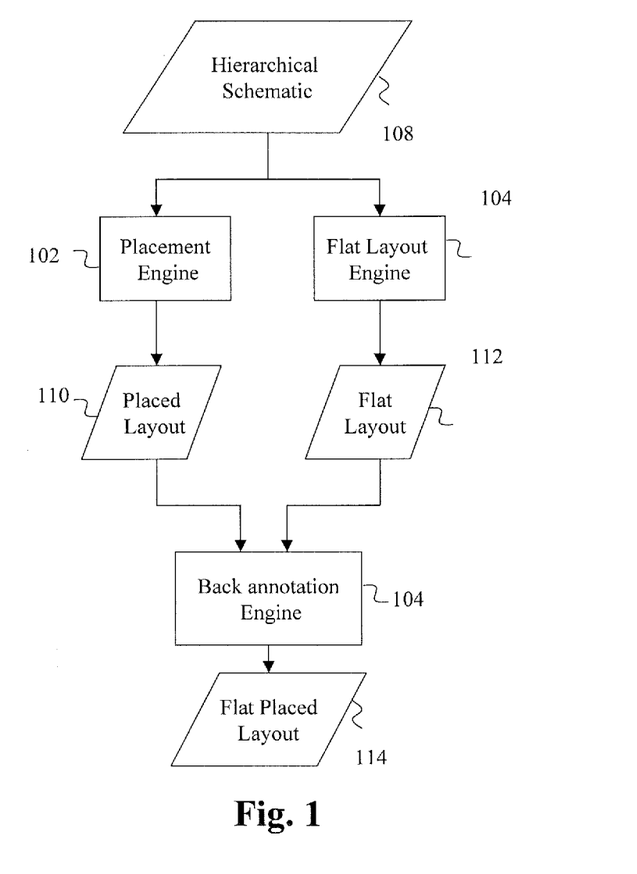
FIG. 1 shows a data flow diagram according to one embodiment of the present invention.
Figure 5:
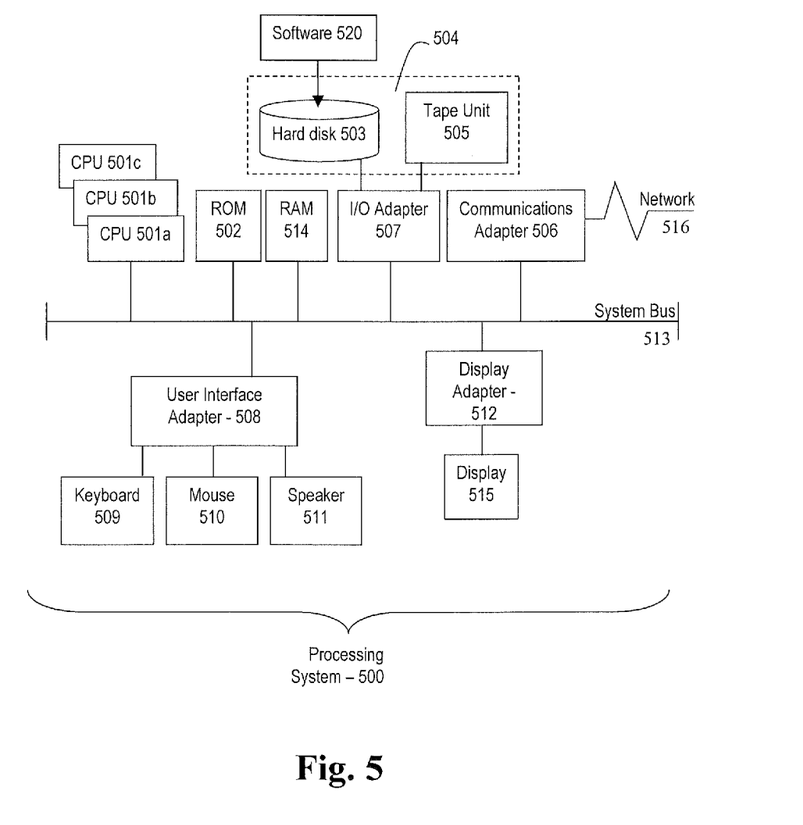
FIG. 5 shows an embodiment of a computing system 500 for implementing the teachings herein.

With reference now to FIG. 1, a data flow diagram for a system 100 for fast routing of custom macros according to one embodiment of the present invention is shown. The system may be implemented, for example, on a computing system as shown in FIG. 5. Of course, the system could be formed independently of any other computing system if needed.

The system 100 includes placement engine 102, a flat layout engine 104 and a back annotation engine 106. The placement engine 102 receives an electronic representation of a hierarchical structure 108. The hierarchical structure 108 may be any representation of a circuit diagram that includes multiple building blocks. Examples of the building blocks could include NAND gates and the next higher level could be, for example, a J-K flip-flop.

From the hierarchical structure 108 the placement engine may create a hierarchical, placed layout 110. The placed layout contains the schematic as it may be laid out in a silicon chip and represents the circuit as having hierarchical structure.

Figure 2A:
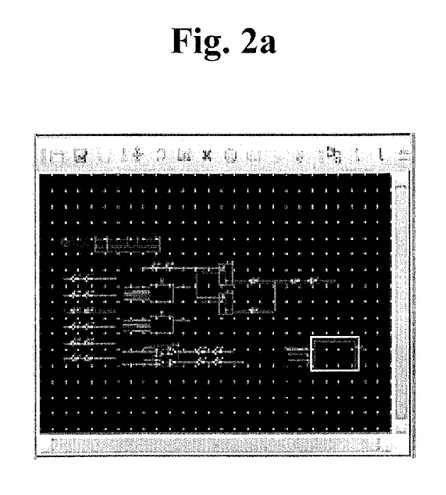
Figure 2B:
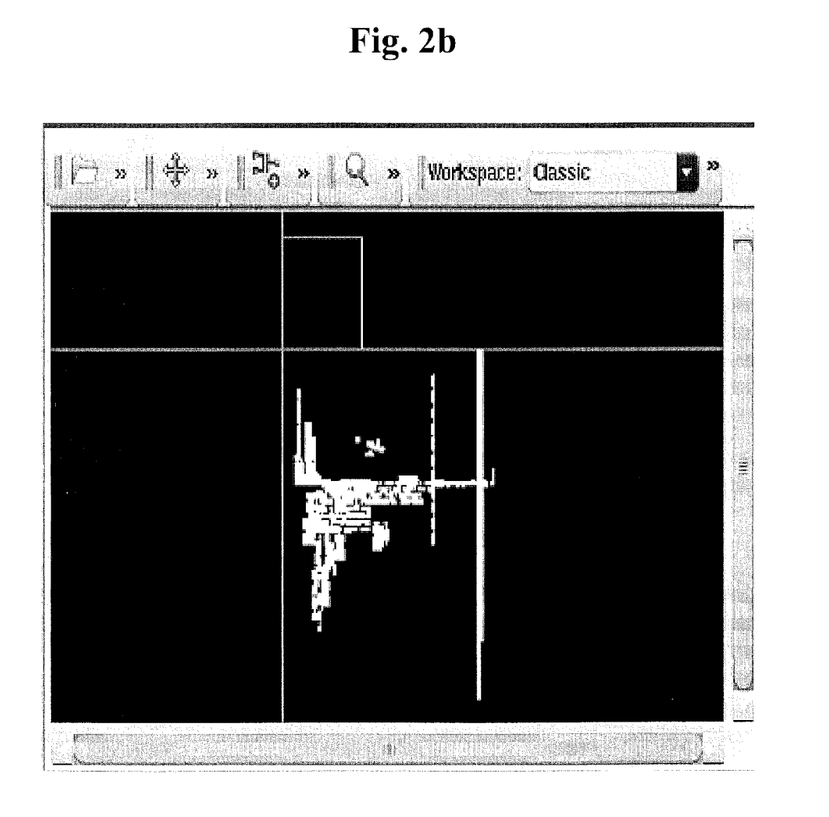

From the hierarchical structure 108 the flat layout engine may create a flat, unplaced layout 112. FIGS. 2a and 2b show an example of a hierarchical schematic diagram (FIG. 2a) and a flat, unplaced layout (FIG. 2b). The schematic diagram 200 includes a plurality of components. Each component is made up of smaller portions. These portions are individually connected via routing wires as shown, for example, in FIG. 2b. This representation, however, has not been placed. As such, the design may not be optimized for space concerns.

In one embodiment, the flat layout 112 may be created by utilizing an automated layout program. As an example, the Cadence Design System includes a "generate from source" command that traverses the schematic hierarchy and creates the corresponding layout instance for each hierarchical sub-block (if it finds any) in the top-level layout. "Generate from source" will only find layouts for instances of standard cell blocks (latches, etc). The new layout will only contain layout instances of standard cell books, no hierarchical layout sub-blocks. That way, "generate from source" will create a flat layout from the hierarchical schematic. Because the new layout has been generated from the schematic, it has all the connectivity information from the schematic but it is unplaced. Of course, other programs or commands may be used. It will be understood that the flat layout 112 includes connectivity information related thereto. That is, the flat layout 112 includes information detailing which standard cell blocks are to be coupled to one another. The routing information, however, may not yet be created.

Referring again to FIG. 1, both the hierarchical, placed layout 110 and the flat, unplaced layout 112 are received by the back annotation engine 106. The back annotation engine 106 combines information received from the hierarchical, placed layout 110 and the flat, unplaced layout 112.

The flat layout 112 has all the connectivity information from the schematic and is ready for routing, but it is unplaced. In one embodiment, the back annotation engine 106 utilizes the placement information from the placed layout 110 to the flat layout 112 to create a flat, placed layout 114. This flat, placed layout 114 can then be routed in one shot.

Figure 3:
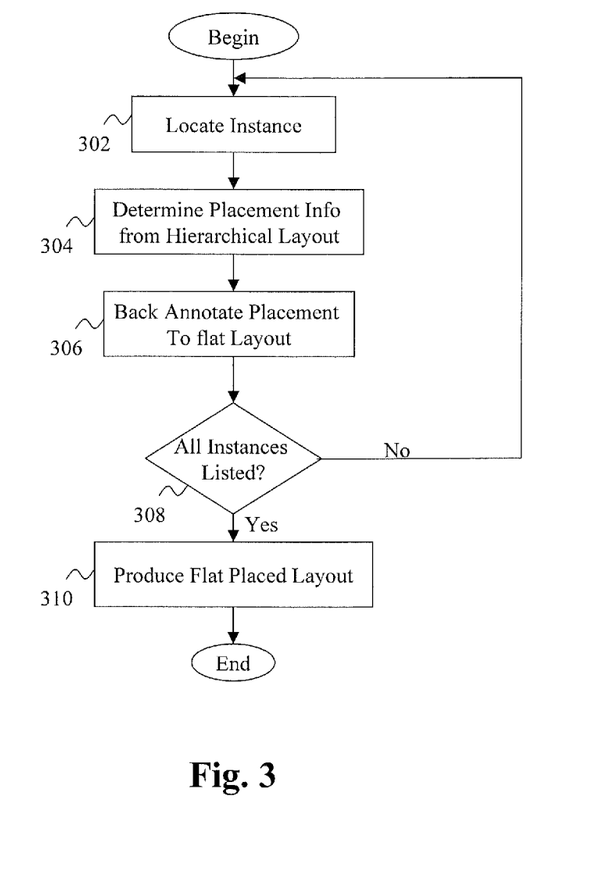
FIG. 3 shows an example of a method by which the back annotation of a flat layout may be produced.

FIG. 3 shows an example of a method by which the back annotation of a flat layout may be produced. It will be understood that the process may be conducted, for example, in the back annotation engine 106 (FIG. 1). It shall also be understood that both the flat and placed layouts are available to the process shown in FIG. 3.

At a block 302 the first/next instance of the lowest level cell is identified in the flat layout. In one embodiment, this may include creating a list of all cells and keeping track of which cells has been analyzed.

At a block 304, placement information for each lowest level cell is determined. This may be done, for example, by examining the location of each cell in the placed layout. As discussed above, the placed layout is hierarchical in nature.

At a block 306, the placement information is back annotated to the flat layout. The flat layout already has all of the connectivity information. As such, by combining the location and connectivity information, the basis for a flat, placed layout is formed that may be easily routed.

At a block 308 it is determined if any other instances exist. If so, processing returns to block 302. If not, processing is completed and at a block 310 a flat placed layout may be created. The flat placed layout may be routed in the conventional manner. Since the layout is flat and has all the connectivity, the layout can be routed in one single routing step, thereby avoiding the delays of prior custom macro routing.

Figure 4:
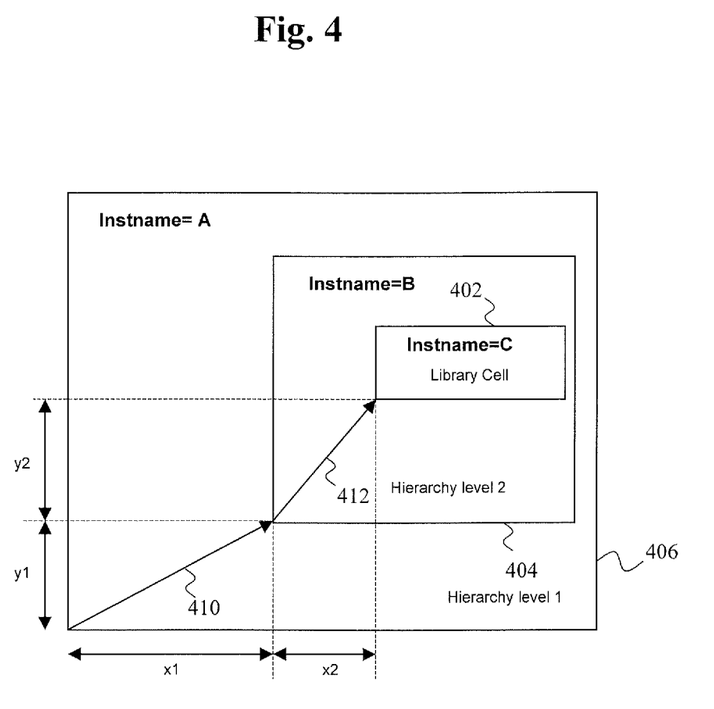
FIG. 4 is a schematic showing one way in which the location of the cells may be determined.

FIG. 4 is a schematic showing one way in which the location of the cells may be determined. The schematic shows a cell of interest 402. The cell of interest 402 is part of a larger cell 404 at a higher level of a hierarchy. For example, the cell of interest 402 could be a NAND gate and the larger cell 404 could be a J-K flip-flop. A largest cell 406 includes both the larger cell 404 and the cell of interest 402.

In one embodiment, each instance (cell) is given a name. For example, the largest instance 406 may be referred to as instance A, the larger cell 404 may be referred to as instance B and the cell of interest 402 may be referred to as instance C. In one embodiment, the instance name in the flat layout may be assigned the concatenation of the hierarchical instance names. For example, the cell of interest 402 may be referred to as instance_name=|A|B|C. In, for example, block 306 the back annotation of the location may include traversing each level of the concatenation. To locate the position of the cell of interest 402 the string is broken into portions and each portion is one level of the hierarchy. As the string is traversed using, for example, SKILL code, relative placement information is accumulated. For example, the location of instance C may be stored at the two vectors 410 and 412 shown in FIG. 4.

FIG. 5 shows an embodiment of a computing system 500 for implementing the teachings herein. In this embodiment, the system 500 has one or more central processing units (processors) 501a, 501b, 501c, etc. (collectively or generically referred to as processor(s) 501). In one embodiment, each processor 501 may include a reduced instruction set computer (RISC) microprocessor. Processors 501 are coupled to system memory 514 and various other components via a system bus 513. Read only memory (ROM) 502 is coupled to the system bus 513 and may include a basic input/output system (BIOS), which controls certain basic functions of system 500.

The system may also include an input/output (I/O) adapter 507 and a network adapter 506 coupled to the system bus 513. I/O adapter 507 may be a small computer system interface (SCSI) adapter that communicates with a hard disk 503 and/or tape storage drive 505 or any other similar component. I/O adapter 507, hard disk 503, and tape storage device 505 are collectively referred to herein as mass storage 504. In one embodiment, the mass storage may include or be implemented as a database for storing enterprise architecture information. A network adapter 506 interconnects bus 513 with an outside network 516 enabling data processing system 500 to communicate with other such systems. A screen (e.g., a display monitor) 515 is connected to system bus 513 by display adaptor 512, which may include a graphics adapter to improve the performance of graphics intensive applications and a video controller. In one embodiment, adapters 507, 506, and 512 may be connected to one or more I/O busses that are connected to system bus 513 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 513 via user interface adapter 508 and display adapter 512. A keyboard 509, mouse 510, and speaker 511 all interconnected to bus 513 via user interface adapter 508, which may include, for example, a Super I/O chip integrating multiple device adapters into a single integrated circuit.

Thus, as configured in FIG. 1, the system 500 includes processing means in the form of processors 501, storage means including system memory 514 and mass storage 504, input means such as keyboard 509 and mouse 510, and output means including speaker 511 and display 515. In one embodiment, a portion of system memory 514 and mass storage 504 collectively store an operating system such as the AIX® operating system from IBM Corporation to coordinate the functions of the various components shown in FIG. 1.

It will be appreciated that the system 500 can be any suitable computer or computing platform, and may include a terminal, wireless device, information appliance, device, workstation, mini-computer, mainframe computer, personal digital assistant (PDA) or other computing device.

Examples of operating systems that may be supported by the system 500 include Windows 95, Windows 98, Windows NT 4.0, Windows XP, Windows 2000, Windows CE, Windows Vista, Macintosh, Java, LINUX, and UNIX, or any other suitable operating system. The system 500 also includes a communications adapter 506 for communicating over a network 516. The network can be a local-area network (LAN), a metro-area network (MAN), or wide-area network (WAN), such as the Internet or World Wide Web.

Users of the system 500 can connect to the network 516 through any suitable network adapter 506, such as standard telephone lines, digital subscriber line, LAN or WAN links (e.g., T1, T3), broadband connections (Frame Relay, ATM), and wireless connections (e.g., 802.11(a), 802.11(b), 802.11 (g)).

As disclosed herein, the system 500 includes machine readable instructions stored on machine readable media (for example, the hard disk 504) for capture and interactive display of information shown on the screen 515 of a user. As discussed herein, the instructions are referred to as "software" 520. The software 520 may be produced using software development tools as are known in the art. The software 520 may include various tools and features for providing user interaction capabilities as are known in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for creating layout and wiring diagrams for an integrated circuit (IC), the system including:
   a placement engine configured to receive a hierarchical schematic and to create a placed layout;
   a flat layout engine configured to receive the hierarchical schematic and to create a flat unplaced layout; and
   a back annotation engine coupled to the placement engine and the flat layout engine, the back annotation engine configured to receive the hierarchical placed layout and the flat unplaced layout and to create a flat placed layout there from.

2. The system of claim 1, wherein the hierarchical schematic includes a hierarchical representation of integrated circuit.

3. The system of claim 1, wherein the placed layout does not include connectivity information.

4. The system of claim 1, wherein the flat layout does not include hierarchical information and does include connectivity information.

5. The system of claim 1, wherein the flat placed layout includes connectivity information.

6. The system of claim 1, wherein the back annotation engine is configured to traverse the hierarchical placed layout and combine the connectivity information from the flat layout with the path taken while traversing the placed layout.

7. The system of claim 6, wherein the back annotation engine is formed by a SKILL code algorithm.

8. A computer based method of creating a flat placed layout for use in routing an integrated circuit (IC), the method comprising:
   creating a hierarchical schematic of the integrated circuit, the hierarchical schematic including high level descriptions of circuit components wherein each circuit component includes one or more cells of interest;
   creating at a placement engine a hierarchical, placed, non-routed layout from the hierarchical schematic;
   creating at a flat layout engine a flat layout from the hierarchical schematic, the flat layout including connectivity information between the one more cells of interest;
   for each cell of interest, traversing the hierarchical, placed, non-routed layout and accumulating relative placement information and back annotating the relative placement information to the connectivity information; and creating a routing diagram from a result of the back annotation.

9. The method of claim 8, wherein the hierarchical schematic is created on a computing system.

10. The method of claim 8, wherein the placed, non-routed layout and the flat layout are created from the hierarchical schematic on a computing system.

11. The method of claim 8, wherein each cell of interest is assigned an instance name that is the concatenation of each hierarchy level traversed to reach the cell of interest.

12. The method of claim 8, wherein the routing diagram is produced from the back annotation of the relative placement information.

13. A computer program product for creating a flat placed circuit diagram, the computer program product comprising:
   a non-transitory storage medium readable by a processing circuit and storing instructions for execution by the processing circuit for facilitating a method including:
   creating a hierarchical schematic of the integrated circuit, the hierarchical schematic including high level descriptions of circuit components wherein each circuit component includes one or more cells of interest;
   creating a placed, non-routed layout from the hierarchical schematic;
   creating a flat layout from the hierarchical schematic, the flat layout including connectivity information between the one more cells of interest;
   for each cell of interest, traversing the placed, non-routed, layout and accumulating relative placement information and back annotating the relative placement information to the connectivity information; and
   creating a routing diagram from a result of the back annotation.

* * * * *